Oct. 21, 1958

E. R. CARLSON 2,857,452

ELECTRICAL FIXTURE

Filed June 10, 1953

INVENTOR
Ernest R. Carlson
BY
Wooster & Davis
ATTORNEYS

United States Patent Office 2,857,452
Patented Oct. 21, 1958

2,857,452
ELECTRICAL FIXTURE

Ernest R. Carlson, Bridgeport, Conn., assignor to Harvey Hubbell, Incorporated, Bridgeport, Conn., a corporation of Connecticut Application June 10, 1953, Serial No. 360,680

1 Claim. (Cl. 174—58)

This invention relates to new and useful improvements in electrical devices or fixtures, and has particular relation to such electrical fixtures as wall outlet receptacles, switches and other devices adapted to be mounted in the usual wall outlet boxes mounted in openings in walls, baseboards and the like, and to which the lead wires of the house wiring system are connected.

An object of the invention is to provide an electrical fixture of the class indicated with an improved arrangement of cooperating shoulders on its body and a mounting yoke or bridge whereby this body is positively maintained within the bridge or yoke, and may not be pulled out of this bridge or yoke when the device is mounted in the wall box.

With the foregoing and other objects in view I have devised the construction illustrated in the accompanying drawing forming a part of this specification. It is, however, to be understood the invention is not limited to the specific details of construction and arrangement shown, but may embody various changes and modifications within the scope of the invention.

Figure 1:
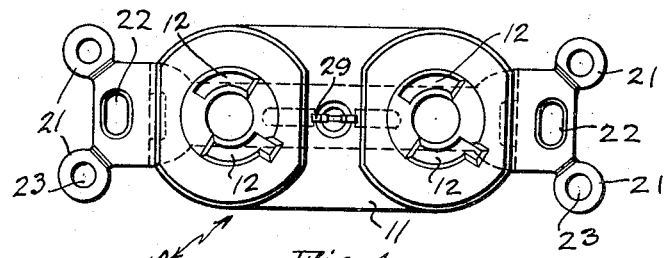
Fig. 1 is a top plan or front face view of an outlet receptacle used as an example to illustrate the present invention.
Figure 2:
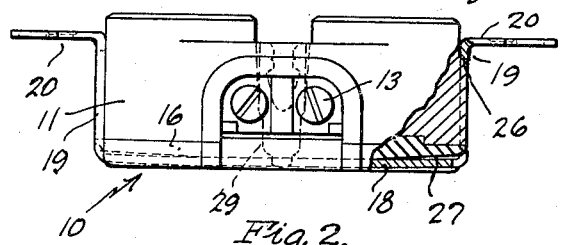
Fig. 2 is a side elevation thereof with portions broken away.
Figure 3:
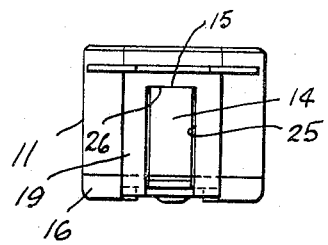
Fig. 3 is an end view looking from the right of Fig. 2.

In this type of device it is common to secure the mounting yoke or bridge to the body of the fixture by a rivet extending through the central part of the yoke. With this arrangement, however, pull on the body member, as for example in the case of an outlet receptacle, pull on the attachment plug caps inserted in the receptacle to remove them by pulling outwardly, may cause a sufficient outward pull on the body to bend the yoke or bridge backwardly so that the fixture is out of place. This is effectively prevented with the present construction.

In the drawings a duplex outlet receptacle 10 is shown by way of example to illustrate the invention, and this fixture includes a body 11 of suitable insulating material, provided with two pairs of entrance slots 12 in its front wall for insertion of the contact blades of suitable attachment plug caps for engagement with suitable receptacle contact elements (not shown) mounted in the body of the receptacle inwardly of these slots. Binding screws for the connection of the conductor wires of the house wiring system to these contacts are shown at 13. At each of its opposite ends the insulating body 11 is provided with an upwardly raised rib 14 extending in a direction forwardly and rearwardly of the body and with its forward end forming a forwardly facing shoulder 15. This shoulder may be in any suitable location, but ordinarily the rib is of less length than the height of the body so that the shoulder is spaced rearwardly from the front face of the body. In the form shown the rear of the body 11 includes the cover plate 16, also of insulating material, enclosing the rear open sides of the recesses in the body in which the receptacle contacts are mounted.

Figure 8:
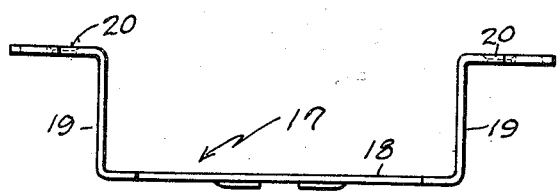
Fig. 8 is a side view looking toward the bottom of Fig. 6.

A mounting yoke or bridge 17 is used for mounting the fixture and the body 11 in a wall outlet box (not shown). Such yoke is generally of metal of suitable thickness and sufficiently yieldable and resilient for the action presently to be described. It is substantially U-shaped as indicated in Fig. 8, and includes an intermediate connecting portion 18, end arms 19 extending forwardly therefrom, and outwardly projecting end portions 20 which may or may not have the removable ears 21, as desired. The portions 20 usually have elongated openings 22 for passage of the mounting screws for securing them to the mounting lugs in the wall outlet box, and where the break-off ears 21 are provided they are provided with openings 23 so that when the ear is broken off they may be used as spacing washers on the mounting screws.

The ribs 14 formed in the end walls of the body may or may not be located in shallow upright channels 24 in the end wall, and the arms 19 of the yoke when such channels are used may be of substantially the width of these channels to seat in them. Each of these arms is provided with an elongated, preferably rectangular opening 25 somewhat wider than the rib 14 and at its forward end is provided with a rearwardly facing shoulder 26. This shoulder is so located that when the yoke is assembled on the body the arms 19 may be sprung because of their resiliency to snap each arm over the rib 14 so that the rib is located within the opening 25 and the rearwardly facing shoulder 26 at the forward end edge of this opening is snapped over and seats on the forwardly facing shoulder 15 at the forward end of the rib. To permit this action the rear face or surface of the body is provided with forwardly inclined portions 27 adjacent its opposite ends to provide clearance for this action of the yoke. These inclined portions may be located in a longitudinally extending channel 28 in the rear wall of the body adapted to receive the connecting portion of the yoke.

Figure 4:
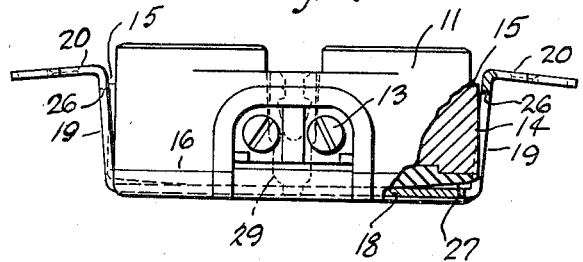
Fig. 4 is a view similar to Fig. 2 showing the mounting yoke or bridge in position prior to being snapped into its final position.
Figure 5:
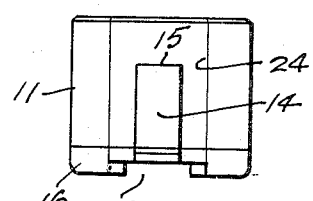
Fig. 5 is an end view of the body looking from the right of Fig. 4 with the mounting yoke removed.
Figure 6:
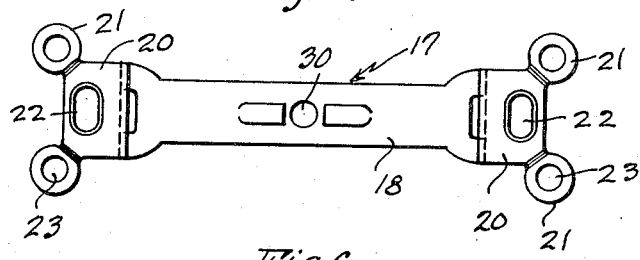
Fig. 6 is a top plan view of the mounting yoke.
Figure 7:
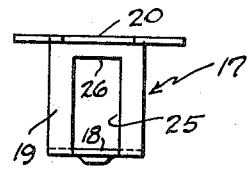
Fig. 7 is an end view thereof looking from the right of Fig. 6.

In assembling the fixture the receptacle body 11 is inserted into the yoke 17 to locate the rear wall of the body against the connecting portions 18 of the yoke and with the body between the end arms 19 of the yoke. The yoke and body may or may not be connected by a suitable fastener 29 passing through the body from the front and riveted over the opening 30 in the yoke. When the parts are initially placed together they are as shown in Fig. 4 with the arms 19 of the yoke free of the ribs 14 on the body. It will be noted that in this position the connecting portion 18 of the yoke is in the longitudinal groove or channel 28 in the back of the body member, in this device the cover 16 forms a part of the body, but the arms 19 of the yoke are inclined outwardly somewhat with respect to the ends of the body. The clearance provided by the inclined walls 27 permits the opposite end portions of the connecting bar 18 to be forced forwardly, and the outer free ends of the arms 19 inwardly, thereby to snap the shoulder 26 at the forward end of the opening in the arm over the forwardly facing shoulder 15 formed on the forward end of the rib 14. This is due to the resilient action of the yoke, and permits the springing of the yoke to snap over the end of the ribs 14 to permit the shoulder 26 to seat on and engage the shoulder 15, and the resilient or spring action of the yoke will retain this position and retain the body in the yoke.

It will be seen that in this arrangement the body is effectively and securely mounted in the yoke, and that instead of being merely connected to the yoke at its central portion by the securing rivet or element 29 it is positively secured in and held by the yoke at its opposite ends, so that any outward pull on the body is taken by the cooperating shoulders 26 and 15 at the end arms of the yoke and the end walls of the body, instead of at the central connection between the rivet 29 and the yoke. There is therefore no tendency to bend the yoke at the center, and no chance of pulling the body out of position away from the yoke or pulling it out of its proper position in the wall outlet box. Also, since the end portions of the yoke are sprung to snap the shoulders 26 behind the shoulders 15, the yoke is tensioned on the body 10 and there is a constant pressure or engagement of the shoulders 26 of the yoke against the shoulders 15 of the body member. This arrangement whereby the yoke is sprung to snap the shoulders 26 into place is also an advantage in that it compensates for and permits manufacturing tolerances and permits use of the device with variations caused thereby; that is, with this described construction the location of the various shoulders from the front or the rear of the body need not be exactly the same, but normal differences due to variation in the amount of shrinkage or other causes will be compensated for by the variations permitted by the springing of the end portions of the yoke.

Having thus set forth the nature of my invention, I claim:

An electric fixture including a body of insulating material, a mounting yoke extending along the rear of said body and having forwardly extending arms at the ends of the body terminating in laterally extending end portions provided with means for securing them to an outlet box, said body being provided with a raised rib at each end provided with a forwardly facing shoulder at the forward end of said rib, said arms each being provided with an elongated opening in which the rib is seated and the forward end of which opening forms a rearwardly facing shoulder engaging the shoulder on the rib, and said yoke being resilient so the arms may be sprung for each to receive the adjacent rib on the body in said opening in the arm and snap the shoulder at the end of the opening over the shoulder at the end of the rib and retain the body in the yoke.

References Cited in the file of this patent

UNITED STATES PATENTS

| | | |
|---|---|---|
| 2,201,743 | Petersen | May 21, 1940 |
| 2,231,976 | Von Holtz | Feb. 18, 1941 |